United States Patent
Fazzini

(10) Patent No.: US 7,580,077 B2
(45) Date of Patent: Aug. 25, 2009

(54) CONVERSION OF VIDEO DATA FROM INTERLACED TO NON-INTERLACED FORMAT

(75) Inventor: Paolo Giuseppe Fazzini, Watford (GB)

(73) Assignee: Imagination Technologies Limited, Hertfordshire (GB)

( * ) Notice: Subject to any disclaimer, the term of this patent is extended or adjusted under 35 U.S.C. 154(b) by 465 days.

(21) Appl. No.: 11/125,413

(22) Filed: May 9, 2005

(65) Prior Publication Data
US 2006/0176393 A1  Aug. 10, 2006

(30) Foreign Application Priority Data
Feb. 8, 2005  (GB)  ............................. 0502597.8

(51) Int. Cl.
*H04N 11/20* (2006.01)
*H04N 7/01* (2006.01)

(52) U.S. Cl. .................................. 348/448; 348/458
(58) Field of Classification Search ............... 348/448, 348/441, 443, 447, 452, 458–459, 699–700; *H04N 11/20, H04N 7/01*
See application file for complete search history.

(56) References Cited

U.S. PATENT DOCUMENTS

| | | | |
|---|---|---|---|
| 5,532,751 A | 7/1996 | Lui | |
| 5,832,143 A | 11/1998 | Suga et al. | |
| 5,886,745 A | 3/1999 | Muraji et al. | |
| 6,133,957 A | 10/2000 | Campbell | |
| 7,042,512 B2 * | 5/2006 | Yang et al. | 348/452 |
| 7,224,399 B2 * | 5/2007 | Song | 348/452 |
| 2002/0196362 A1 | 12/2002 | Yang et al. | |
| 2004/0263685 A1 | 12/2004 | Song | |

FOREIGN PATENT DOCUMENTS

| | | |
|---|---|---|
| EP | 0 735 748 A2 | 10/1996 |
| EP | 0 735 748 A3 | 5/1997 |
| EP | 0 785 683 A2 | 7/1997 |
| GB | 2 402 288 A | 12/2004 |

OTHER PUBLICATIONS

Search Report dated May 17, 2005 in Great Britain Application No. 0502597.8 (1 page).
Combined Search and Examination Report dated May 18, 2005 in Great Britain Application No. 0502597.8 (2 pages).
U.S. Appl. No. 11/125,412, filed May 9, 2005, Inventor: Paolo Giuseppe Fazzini.
U.S. Appl. No. 11/125,416, filed May 9, 2005, Inventor: Paolo Giuseppe Fazzini.
International Search Report and Written Opinion mailed Nov. 10, 2006 in International Appln. No. PCT/GB2006/000434.

* cited by examiner

*Primary Examiner*—Trang U Tran
(74) *Attorney, Agent, or Firm*—Flynn, Thiel, Boutell & Tanis, P.C.

(57) ABSTRACT

A method and an apparatus are provided for converting an interlaced video signal to a progressive scan signal. For each pixel in each missing line of a video field in a video signal to be converted, correlation data is derived for each of a set of possible interpolations between adjacent pixels to be used in reconstructing a missing pixel.

A confidence measure is derived from the correlation data and adjustment data for correlation data is selected. The correlation data is then adjusted with the adjustment data, and on the resultant data a determination is made as to which interpolation scheme is most likely to produce an accurate missing pixel. The missing pixel is then interpolated using the selected interpolation scheme.

11 Claims, 4 Drawing Sheets

CONVERSION OF VIDEO DATA FROM INTERLACED TO NON-INTERLACED FORMAT

BACKGROUND OF THE INVENTION

This invention relates to a method and an apparatus for converting an interlaced video signal to the interlaced or progressive scan video signal, and in particular to a method and an apparatus which provide appropriate control to the effectiveness of the conversion.

Broadcast television signals are usually provided in interlaced form. For example, the phase alternate line (PAL) system used in Europe is made up of video frames comprising two interlaced fields. Each field comprises alternate lines of the frame. Thus, when the signal is applied to a display, the first field will be applied to the odd numbered lines of the display followed by the second field being applied to the even numbers lines of the display. The frame rate, the rate at which frames comprising two interlaced fields are applied to a display, is usually 50 Hz.

Progressive scan displays interpolate within the fields of each frame and sometimes between adjacent fields to provide data for the missing lines in each field, thereby converting each field to a frame and doubling the effective frame rate of the display. One of the problems when interpolating the missing lines of video fields is that accurate detection of edges or contours marks variations in the visible information. U.S. Pat. No. 5,532,751 shows the variation between pixels which are used to interpolate missing pixels to detect edges or contours. If the variation is below a threshold, the orientation of an edge is estimated and a new pixel is formed from the average of the pixels lying along the estimated orientation. If the estimate of edge orientation is unsuccessful, then a new pixel is formed from the average of two vertically aligned pixels within a field. This technique can generate artefacts in pictures which have two or more pairs of pixels with high resemblance.

An improvement upon this method is disclosed in U.S. Pat. No. 6,133,957. In this, the variation between pixels or a set of pixels is computed to reconstruct edges or borders. Two variations with the lowest values are used and a reconstructed pixel is generated as a weighted average of the pixels used in the chosen variations.

A further improvement is set out in British Patent No. 2402288. The solution presented here preserves vertical frequencies present in a frame which is being deinterlaced when accurate information on the position of an edge or border is not available.

All the techniques described above fetch input data from one instant of time only and search for the best match in vertically adjacent lines of a video field. They are referred to this patent as border reconstructers (BR).

One of the fundamental ideas behind the BR is the estimation of the correlation between two sets of pixels belonging to two vertically adjacent lines in a field at an instant of time.

FIG. 1 shows three representations of short sections of two adjacent lines in a video field. In the example given in FIG. 1, we see only the lines from the current field being used although one or more adjacent fields can also contribute to the interpolation used to the derivation of pixel data for the missing lines as can additional lines in the current field.

In FIG. 1, three different possible interpolations schemes are shown and correlations are evaluated for these. The middle scheme comprises the correlation of the data in the pixels located above and below the pixel, to be reconstructed, and the correlation of data between pairs of pixels positioned immediately adjacent to the pixels to be reconstructed. A further possible interpolation is evaluated in the left-hand example of FIG. 1 by showing the correlation between pixels on lines which pass diagonally sloping down to the right through the pixel being reconstructed. The same process with the opposite diagonals is shown in the right-hand examples of FIG. 1.

The correlation between the data in the various pairs of pixels can be derived using the sum of absolute differences (SAD) or the mean square error, or other well-known statistical techniques. The sum of absolute differences and the mean square error are derived as follows:

$$SAD = \sum_i |Ytop[i] - Ybot[n-i]|$$

$$MSE = \sum_i (Ytop[i] - Ybot[n-i])^2$$

In the above formulas, Ytop and Ybot represent the luminance of the pixels in the lines located above and below the pixel, to be reconstructed in a field, and n is the number of pixels in each row. The luminance of a pair of pixels is involved in each single difference.

The graph on the right-hand side of FIG. 1 shows an example of SAD based procedure using five pixels only for each row and three correlations of symmetrically located sets of pixels, each set being made up of the three pixel pairs. In practice, more pixels are involved in the computation to ensure greater accuracy. Preferably, between 7 and 30 pixels pairs are used.

If we use the SAD approach to comparing the values of pairs of pixels, then FIG. 1 leads to 3 SAD values. SAD 0, SAD 1 and SAD 2 which are shown graphically at the right-hand side of FIG. 1. This can be considered the correlation curve for the various possible interpolations. In many techniques, the interpolation scheme which gives the smallest difference in SAD or the smallest means square error (MSE) does not always produce the best quality for final image. This is because the content of the image in the neighborhood of the pixel being reconstructed can affect the SAD or MSE. For example, if there are a few thin lines passing close to the pixel to be reconstructed, there is a risk that in reconstruction, the lines result in pixelation in the final image or flickering in the video sequence. In U.S. Pat. No. 6,133,957 and GB 2402288 this problem has been addressed by blending several relative minima in a correlation curve together and has also been approached by clamping the result using the values generated by the pixels directly above and below the one to be reconstructed. The problem with this approach is that even though blending and clamping reduce the effect of incorrect analysis of the correlation curve, this scheme is affected by the incorrect starting point for the procedure.

SUMMARY OF THE INVENTION

We have appreciated that modifying the correlation curve with an adjustment curve selected in dependence on the form of the correlation curve increases the likelihood of selecting the correct minimum value from the correlation curve. The adjustment curve is selected or altered in dependence on a confidence measure derived from the correlation curve data.

Preferably, the local minima for various portions of the correlation data are detected, and the selection of the adjustment curve to combine with the correlation curve to generate the most likely interpolation scheme to produce good results is made in dependence on the relative positions of minima in the correlation data.

Preferably, the correlation data is divided into segments and local minima detected in each segment.

BRIEF DESCRIPTION OF THE DRAWINGS

A preferred embodiment of the invention will now be described in detail by way of examples with reference to the accompanying drawings in which.

DETAILED DESCRIPTION OF PREFERRED EMBODIMENTS

Figure 1:
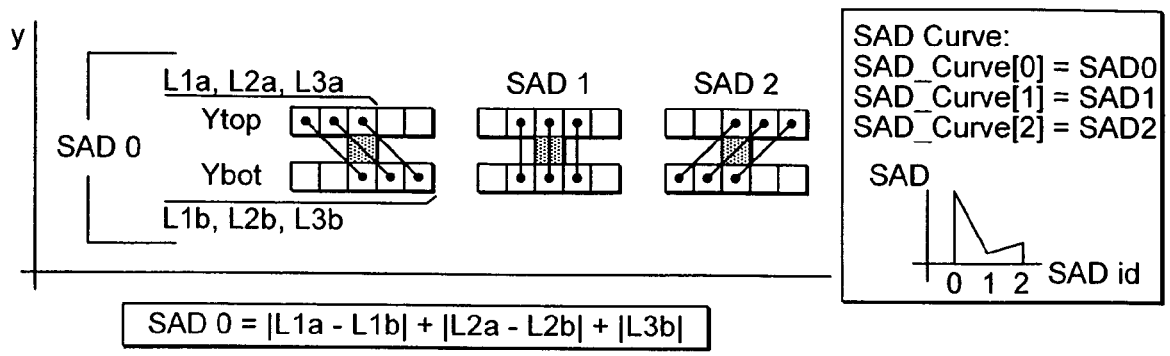
FIG. 1 shows schematically the type of SAD analysis which is made when interpolating missing pixels in converting interlaced video signals to progressive scan signals.
Figure 2:
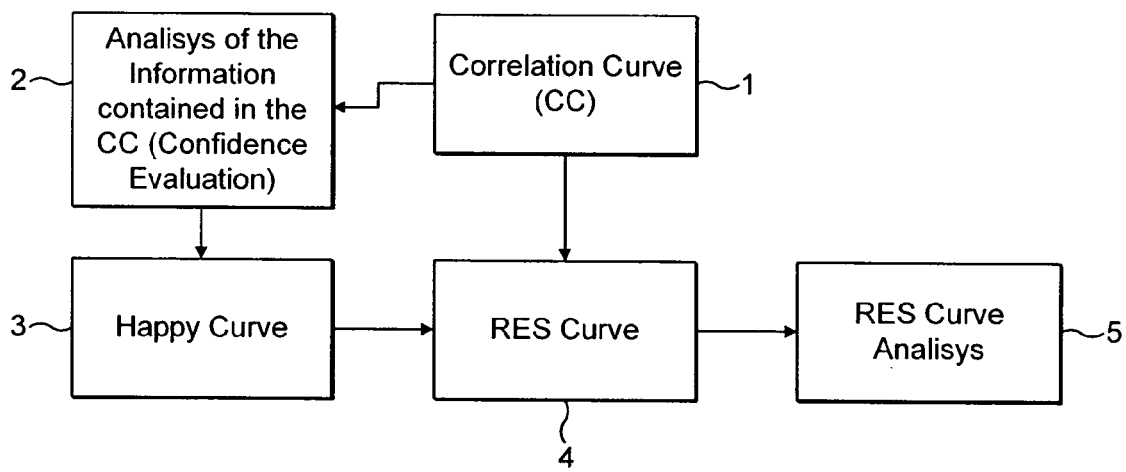
FIG. 2 shows a block diagram of the processes which have to take place in an embodiment of the invention.

The diagram of FIG. 2 is now explained with reference to five pixel interpolation schemes shown in FIG. 1. As mentioned above, in practice more pixels than five will be used and more interpolation schemes than three shown in FIG. 1 will be used but we refer to these for ease of understanding.

In FIG. 2, unit 1 performs the derivation of the correlation data for the correlation curve shown in FIG. 1. In this example three points are used.

Figure 3:
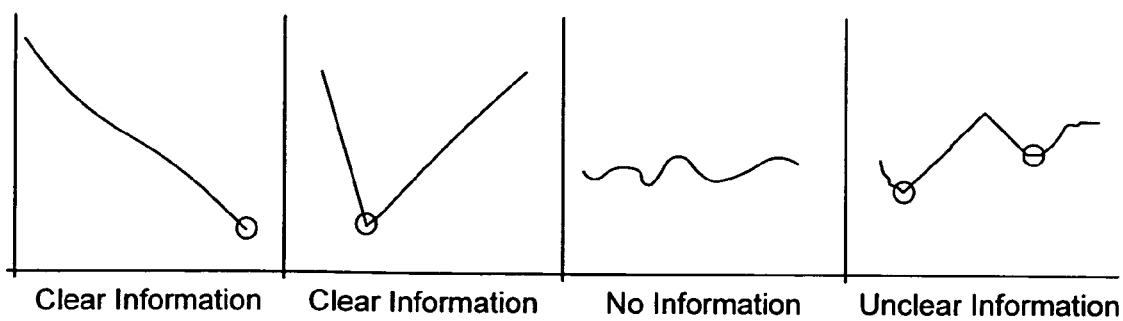
FIG. 3 shows a number of different examples of the correlation curves which might be obtained.

In unit 2, an analysis of the information contained in the correlation curve is performed to produce a confidence evaluation for the curve in the form of the confidence data. This comprises a measure as to the clarity of the information contained in the correlation data. Examples of the type of the correlation curve which can be generated with the correlation data are shown in FIG. 3. Each of the two left-hand side curves has clear maxima and a single minimum. Thus, it is highly likely that the minimum value created by the SAD of FIG. 1 from the various sets of pairs of pixels is the correct minimum to use and therefore the correct set of pairs of pixels to use for the interpolation of the pixel of a missing line. The third curve of FIG. 3 has three minima and three maxima. Therefore the data for this graph gives no indication as to which of the minima detected is the most relevant.

The fourth example in FIG. 3 gives a curve with two distinct minima. Either of these could be the correct one to use in determining the interpolation scheme to use. However, they are physically separated by a number of pixels and therefore it is unclear which of them should be used.

In FIG. 2, the correlation data is generated in a logical sequence, for example as shown in FIG. 1 starting with the left-hand interpolation scheme and moving to the right. Whatever scheme is adopted, a logical sequence is required so that there is an incremental change in the relative positions of the pixels being used by the interpolation scheme. In graphical representation, this would mean, for example, that when looking at the graph on the right-hand side of FIG. 1, the first SAD point plotted is one generated by the pixels selected in the left-hand side scheme of FIG. 1, i.e. the diagonal line joining the pixels slope downwards to the right through the pixel to be reconstructed. For the middle point, the lines joining the pairs of pixels are vertical and for point 2 the lines joining the pairs of pixels slope upwards to the right. A similar type of approach is taken whatever number of pixels or whatever interpolation scheme is used.

Figure 4:
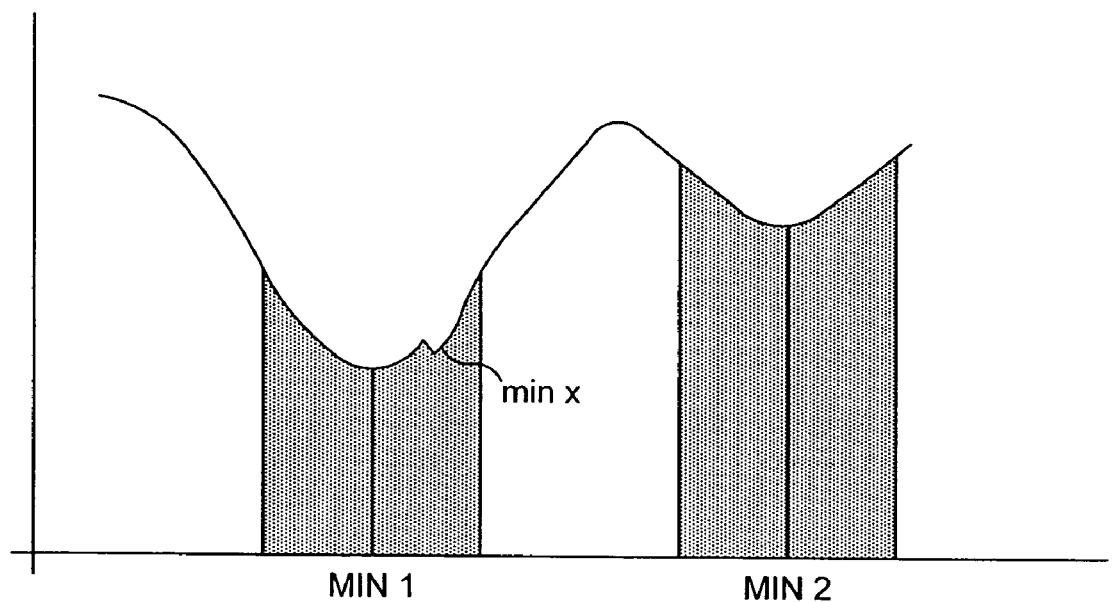
FIG. 4 shows diagrammatically how the correlation curve is analyzed.

In the confidence evaluation stage of FIG. 2, the SAD measurements from FIG. 1 are received in turn from correlation analysis in unit 1. The data as it is received is compared with previous data to determine where local minima occur. Such an example is shown in FIG. 4 for a curve which has two statistically significant minima MIN 1 and MIN 2. There is also a minimum min x which is ignored because its size in proportion to the rest of the curve is insignificant. The confidence evaluation unit 2 determines a confidence measure representing whether the correlation data is likely to produce the correct result for the interpolation scheme to be used, and then uses this measure to select an adjustment data which is combined with the data for each point on the correlation curve. The confidence measure is supplied to adjustment curve unit 3 which selects the adjustment data to use in dependence on the output of the confidence evaluation unit 2 and supplies the data for this curve to a combination unit 4 which combines it with the correlation data from the correlation curve unit 1. The resultant data is then sent to a resultant data analysis unit 5 which can select the appropriate minimum from the resultant data and from this determine which interpolation system (or interpolation angle) (see FIG. 1) should be used in interpolating the missing pixel.

Figure 5:
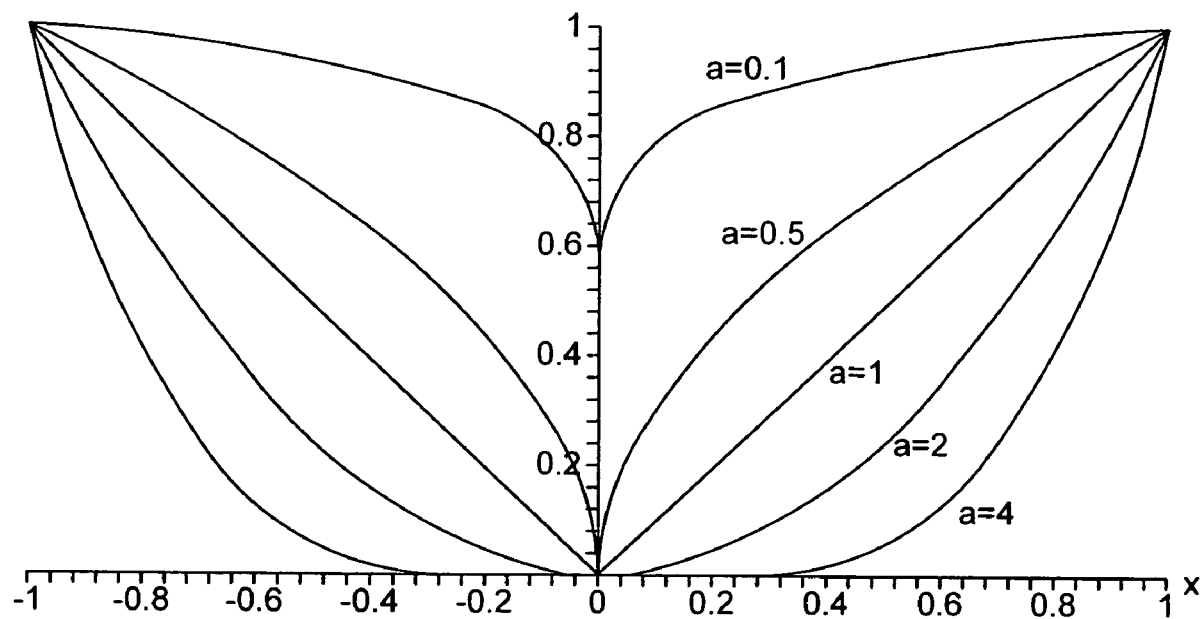
FIG. 5 shows examples of the curves which might be combined with the correlation curve.

The selection of data represented by a curve which might be used by the adjustment curve analysis unit 3 of FIG. 2 is shown in FIG. 5. These are produced by the equation:

$$F(x)=b*|x|^a$$

In this formula b is a parameter which is adjusted in dependence on the confidence evaluation derived from the confidence evaluation unit 2 i.e. the confidence measure. a is a constant in the preferred embodiment and can be related to the confidence measure as well; it defines the type of curve (linear, parabola, cubic . . . ). x relates to the position of the interpolation scheme to which the confidence evaluation relates in the logical sequence of the interpolation schemes.

Figure 6:
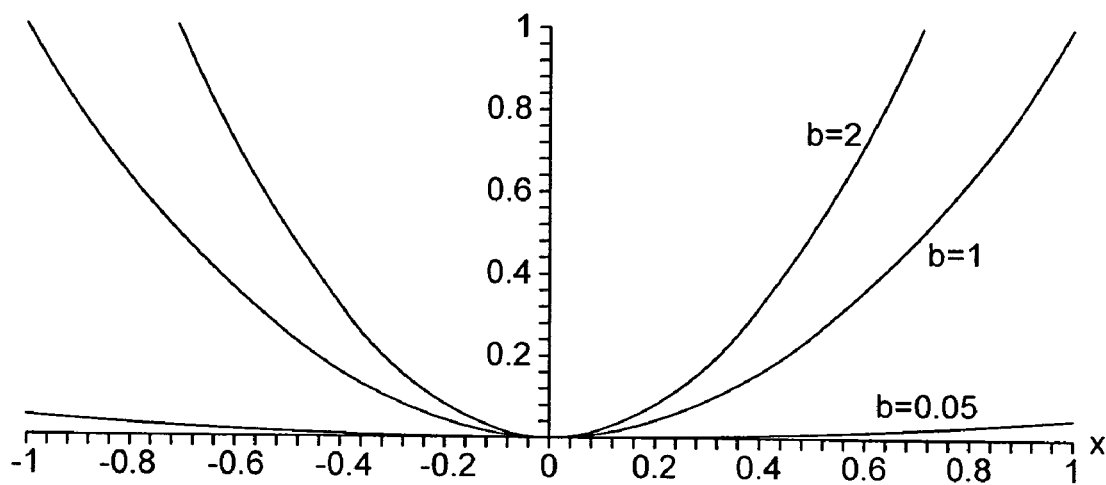
FIG. 6 is a graph which shows the sensitivity of the curves of FIG. 5 to an additional factor.

FIG. 5 shows various different curves for different values of "a" with a value of "b" being 1. Although all of these could deliver good performance in specific cases, we have appreciated that the best overall curve in dealing with many situations is produced by a curve with a fixed value of "a" being 2. Because this exponential value is relatively low, the continuity of the first derivative b is more significant. Examples of this curve for various values of b are shown in FIG. 6. Thus it can be seen that as b increases, the steepness of the curve increases.

The zero value of the curve is in the center of the graph of FIG. 6 and FIG. 5. This corresponds to the center position of the logical incremental interpolation schemes. In FIG. 1 this would be a central interpolation scheme with the pairs of pixels being positioned vertically with respect to the pixel to be reconstructed.

Figure 7:
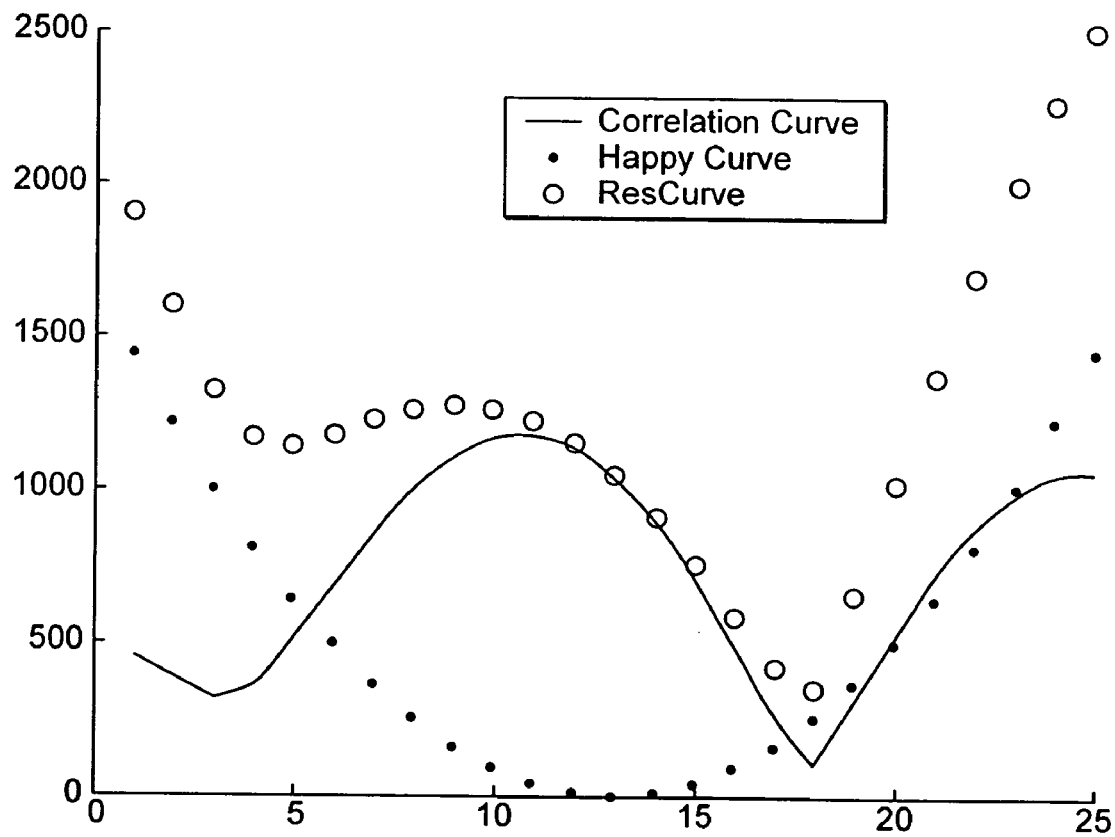
FIG. 7 shows an example of a resultant curve after combination with one of the curves of FIG. 5.

The curve selected in dependence on the confidence measure b is then passed to the resultant curve generation unit which combines the data from the curve with the data from the correlation curve unit 1 to produce data for a resultant curve. This is fed to a resultant curve analysis unit 5 which looks for any minima in the resultant curve. An example of a resultant curve and the components by which the curve is formed is shown in FIG. 7. As can be seen, a correlation curve with two minima which are physically separate after combination with an adjustment curve selected in accordance with a confidence measure derived from the correlation curve produces a resultant curve with one minimum much lower than the other. Thus, the position of this minimum is used to select the interpolation scheme to be used to generate the pixel. This process is performed in turn for each pixel to be interpolated on each line of each field of an input video sequence.

Figure 8:
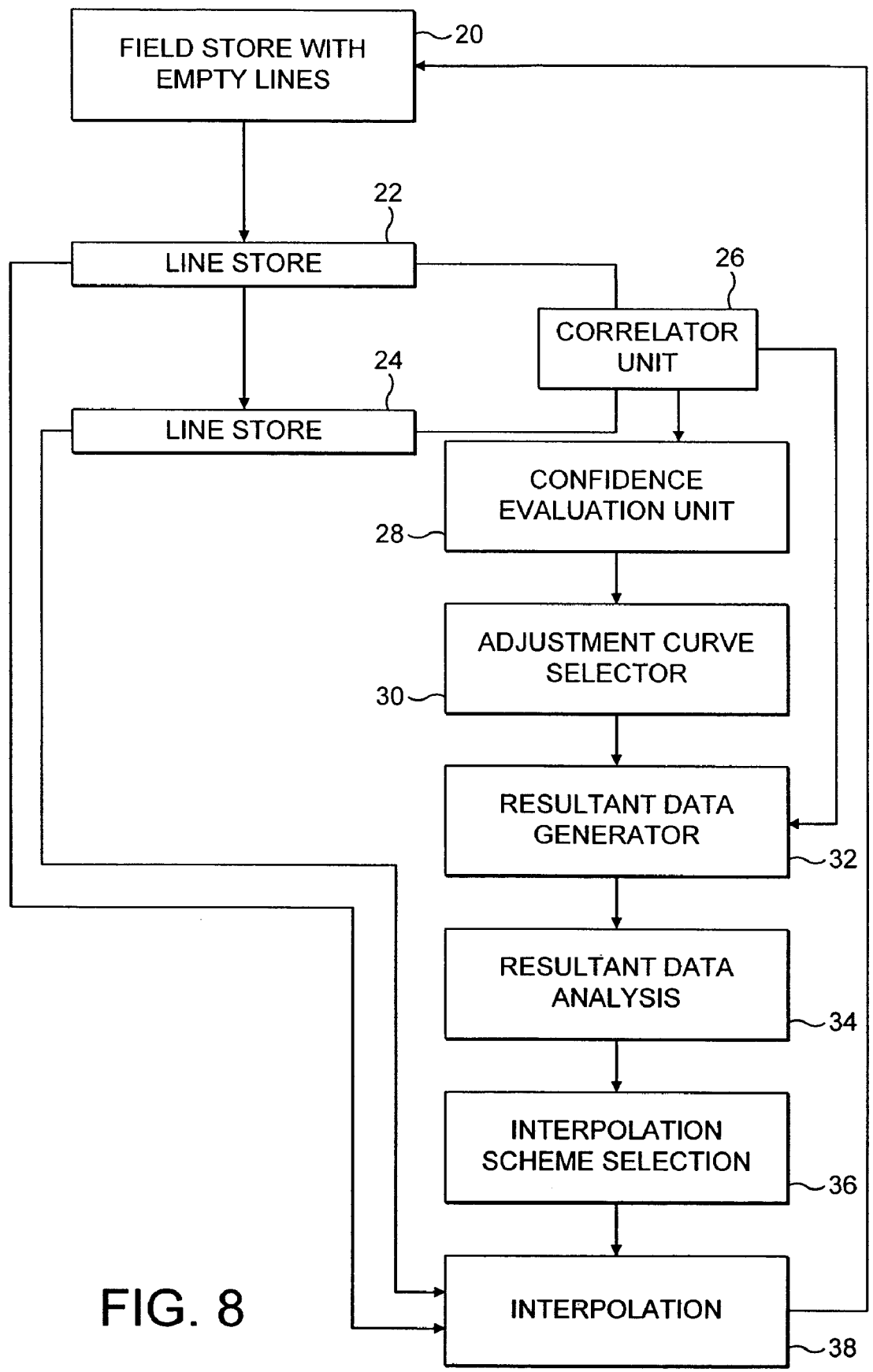
FIG. 8 shows a block diagram of an embodiment of the invention.

A more detailed block diagram of an example of a system embodying the invention is shown in FIG. 8. This comprises a field store 20 to which a field of a new video signal being converted from an interlaced video signal to a progressive scan video signal is stored. From this, each line of the field is read out in turn to line stores 22 and 24. Preferably, a first line is read to the line store 22 and then passed to the line store 24. At the same time, the next line which will be used with the first line for generating the missing lines of the field in the field store is read to the line store 22. The system then analyzes the lines to select the best interpolation schemes that are used for each pixel in turn before passing the line stored in the line store 22 to the line store 24 and reading the next line of the field from the field store 20 to the line store 22.

Once two lines are stored in the line stores 22 and 24, a correlation unit 26 produces, for each pixel in turn to be generated for the line position between the two lines in the line stores 22 and 24, a series of correlations in logical order for the different possible interpolation schemes to be used in generating that pixel. At the ends of the lines, not all the possible interpolations will be available. In this case any standard method to deal with borders can be used: pixel repetition (repeating the last pixel) or mirroring (mirroring the last pixels). It is also possible to force "bob" (i.e. averaging pixels in vertical direction). The correlation unit 26 calculates, for example, a sum of absolute differences or a least means squared analysis of the correlation between different pairs of pixels to be used in each of the interpolation schemes. The sums of absolute differences are provided in turn for each pixel to a confidence evaluation unit 28. When all the values from the correlation unit 26 have been added to the confidence evaluation unit 28, a confidence value is generated. This is related to the positions and the numbers of local minima for the correlation values produced by the correlation unit 26.

This confidence value is then provided to an adjustment curve selector 30 which uses it to modify a predetermined adjustment curve. In its most straightforward form the confidence value is used as a multiplier on the adjustment curve. More complex schemes can be used. Alternatively, the confidence value can be used to select among a plurality of predefined adjustment curves.

The data representing the adjustment curve is then provided from the adjustment curve selector 30 to a resultant data generation unit 32. Here the data from the adjustment curve is combined with the data from the correlation unit 26. For curves where the correlation data for a pixel which has two or more minima, the resultant data generation unit 32 should, by combining the correlation data with the adjustment curve data, produce a set of adjusted correlation data which has a clear minimum value. This clear minimum value is then detected in a resultant data analysis unit 34. The resultant data analysis unit 34 provides data about the correlation value for a pixel which gives the minimum adjusted value. In dependence on this data, an interpolation scheme selector 36 selects an interpolation scheme to be used to generate the pixel in question. The data for that interpolation is then provided either from the line stores 22 and 24 or from the field store 20 to an interpolator 38 which generates the value for the missing pixel. The system then proceeds to the next of the missing pixels to be generated until all of the missing pixels between the lines in the line stores 22 and 24 have been generated. The system then moves the pixel data from the line store 22 to the line store 24 and reads in the next available line from the field store 20. This process continues until the missing lines for the whole field have been generated and the data is available for display.

Preferably the process takes place in real time so that it can be performed on a video signal being received by a television receiver which converts the signal to a non-interlaced form ready for display.

In an improvement on the arrangement of FIG. 8, two or more sets of the hardware of FIG. 8 could be provided for operating in parallel in different lines of the field store 20 to improve processing speed.

Alternatively, the system of the FIG. 8 can be implemented in a dedicated processor. Two or more of the processors can be provided in parallel to improve the speed of processing. One possibility is to have a processor available for each of the missing lines of the field stored in the field store 20 to minimize processing time. This, of course, would make the unit more expensive.

For certain pixels to be generated, the resultant data analysis unit 34 may generate data which remains unclear. In such a situation, a form of exceptional processing is provided. This could include the use of a different adjustment curve to improve the quality of the resultant data output. Other schemes are also possible.

The invention claimed is:

1. A method for converting an interlaced video signal to a progressive scan video signal, the method comprising the steps of:
    deriving, for each pixel in each missing line of a video field in the interlaced video signal to be converted, correlation data, using a correlator unit, for each of a set of possible interpolations between adjacent pixels to be used in reconstructing the pixel in the missing line;
    deriving a confidence measure using a confidence evaluation unit from the correlation data;
    selecting adjustment data using an adjustment curve selector for the correlation data in dependence on the confidence measure;
    adjusting the correlation data with the adjustment data, using a resultant data generator;
    determining, using a resultant data analysis unit, from the adjusted correlation data an interpolation scheme that is most likely to accurately produce the pixel in the missing line; and
    interpolating, by an interpolator, the pixel in the missing line using the interpolation scheme selected by an interpolation scheme selector,
    wherein the step of selecting the adjustment data selects data which will cause greater adjustment of the correlation data as the confidence measure decreases.

2. The method according to claim 1, wherein the step of deriving the confidence measure comprises the steps of determining the number of minima and maxima in the correlation data and determining the confidence measure therefrom.

3. The method according to claim 1, wherein the selected adjustment data causes greater adjustment to the correlation data derived from pixels farthest from the pixel to be reconstructed.

4. The method according to claim 1, wherein the correlation data comprises Sum of Absolute Differences (SAD) data.

5. The method according to claim 4, wherein the step of determining the interpolation scheme that is most likely to accurately produce the pixel in the missing line comprises the step of determining the SAD data with the lowest value.

6. An apparatus for converting an interlaced video signal to a progressive scan video signal comprising:
- means for deriving, for each pixel on each missing line of a video field in the interlaced video signal to be converted, correlation data for each of a set of possible interpolations between adjacent pixels to be used in reconstructing the pixel in the missing line;
- means for deriving a confidence measure from the correlation data;
- means for selecting adjustment data for the correlation data in dependence on the confidence measure;
- means for adjusting the correlation data with the adjustment data;
- means for determining from the adjusted correlation data an interpolation scheme that is most likely to accurately produce the pixel in the missing line; and
- means for interpolating the pixel in the missing line using the selected interpolation scheme,
- wherein the means for selecting the adjustment data selects data which will cause greater adjustment of the correlation data as the confidence measure decreases.

7. The apparatus according to claim 6, wherein the means for deriving the confidence measure comprises means for determining the number of minima and maxima in the correlation data and means for determining the confidence measure therefrom.

8. The apparatus according to claim 6, wherein the selected adjustment data causes greater adjustment to the correlation data derived from pixels farthest from the pixel to be reconstructed.

9. The apparatus according to claim 6, wherein the correlation data comprises Sum of Absolute Differences (SAD) data.

10. The apparatus according to claim 9, wherein the means for determining the interpolation scheme that is most likely to accurately produce the pixel in the missing line comprises means for determining the SAD data with the lowest value.

11. A television receiver including an apparatus for converting an interlaced video signal to a progressive scan video signal comprising:
- means for deriving, for each pixel on each missing line of a video field in the interlaced video signal to be converted, correlation data for each of a set of possible interpolations between adjacent pixels to be used in reconstructing the pixel in the missing line;
- means for deriving a confidence measure from the correlation data;
- means for selecting adjustment data for the correlation data in dependence on the confidence measure;
- means for adjusting the correlation data with the adjustment data;
- means for determining from the adjusted correlation data an interpolation scheme that is most likely to accurately produce the pixel in the missing line; and
- means for interpolating the pixel in the missing line using the selected interpolation scheme,
- wherein the means for selecting the adjustment data selects data which will cause greater adjustment of the correlation data as the confidence measure decreases.

\* \* \* \* \*